(12) United States Patent
Chan

(10) Patent No.: US 11,258,362 B2
(45) Date of Patent: Feb. 22, 2022

(54) BOOST CONVERTER

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 65 days.

(21) Appl. No.: 16/908,408

(22) Filed: Jun. 22, 2020

(65) Prior Publication Data

US 2021/0249956 A1    Aug. 12, 2021

(30) Foreign Application Priority Data

Feb. 11, 2020    (TW) .................................. 109104157

(51) Int. Cl.
*H02M 3/158*    (2006.01)
*H02M 1/00*    (2006.01)
*H02M 3/157*    (2006.01)

(52) U.S. Cl.
CPC ......... *H02M 3/158* (2013.01); *H02M 1/0048* (2021.05); *H02M 3/157* (2013.01)

(58) Field of Classification Search
CPC ............. H02M 1/0003; H02M 1/0012; H02M 1/0016; H02M 1/0022; H02M 1/0041; H02M 1/0048; H02M 1/0054; H02M 1/0083; H02M 1/0093; H02M 3/01; H02M 3/015; H02M 3/02; H02M 3/04; H02M 3/06; H02M 3/10; H02M 3/145; H02M 3/155; H02M 3/1552; H02M 3/156; H02M 3/157; H02M 3/158; H02M 3/1582

See application file for complete search history.

(56) References Cited

U.S. PATENT DOCUMENTS

| 5,543,704 | A | * | 8/1996 | Thoren | .................. | H02M 3/158 323/222 |
| 5,912,549 | A | * | 6/1999 | Farrington | .......... | H02M 1/4225 323/207 |
| 5,982,156 | A | * | 11/1999 | Weimer | ................ | H02M 3/156 323/222 |
| 6,011,382 | A | * | 1/2000 | Littlefield | ............. | H02M 3/156 323/222 |

(Continued)

*Primary Examiner* — Jue Zhang
*Assistant Examiner* — David A. Singh
(74) *Attorney, Agent, or Firm* — McClure, Qualey & Rodack, LLP

(57) ABSTRACT

A boost converter includes a voltage divider circuit, a first comparator, a tunable inductive element, a power switch element, a second comparator, an output stage circuit, and a controller. The voltage divider circuit receives an input voltage. The tunable inductive element is coupled to the voltage divider circuit. The total inductance of the tunable inductive element is controlled by the first comparator. The output stage circuit is coupled to the tunable inductive element and the power switch element. The output stage circuit includes a tunable resistive element. The total resistance of the tunable resistive element is controlled by the second comparator. When the boost converter operates in a first mode, an output voltage of the output stage circuit has a relatively high voltage level. When the boost converter operates in a second mode, the output voltage of the output stage circuit has a relatively low voltage level.

15 Claims, 2 Drawing Sheets

(56) References Cited

U.S. PATENT DOCUMENTS

| | | | | |
|---|---|---|---|---|
| 6,434,029 B1* | 8/2002 | Cyr | ................ | H02M 3/158 |
| | | | | 363/86 |
| 2003/0205990 A1* | 11/2003 | Wittenbreder, Jr. | ..... | H02M 1/34 |
| | | | | 323/222 |
| 2007/0057934 A1* | 3/2007 | Jia | ................ | G09G 3/3696 |
| | | | | 345/211 |
| 2008/0025056 A1* | 1/2008 | Chen | ................ | H02M 1/4225 |
| | | | | 363/80 |
| 2008/0278130 A1* | 11/2008 | Ito | ................ | H02M 1/34 |
| | | | | 323/282 |
| 2010/0061122 A1* | 3/2010 | Okubo | ................ | H02M 3/158 |
| | | | | 363/20 |
| 2011/0122664 A1* | 5/2011 | Yabuzaki | ................ | H02M 1/32 |
| | | | | 363/53 |
| 2011/0215777 A1* | 9/2011 | Braylovskiy | ................ | G05F 1/10 |
| | | | | 323/234 |
| 2014/0027188 A1* | 1/2014 | Holland | ................ | G01G 23/007 |
| | | | | 177/45 |
| 2014/0167633 A1* | 6/2014 | Zhang | ................ | H05B 45/38 |
| | | | | 315/193 |
| 2015/0296574 A1* | 10/2015 | Knoedgen | ................ | H05B 45/3725 |
| | | | | 315/307 |
| 2016/0072384 A1* | 3/2016 | Fan | ................ | H02M 3/156 |
| | | | | 323/282 |
| 2018/0262107 A1* | 9/2018 | Raval | ................ | H02M 3/158 |
| 2018/0278152 A1* | 9/2018 | Gritti | ................ | H02M 1/4225 |
| 2019/0081553 A1* | 3/2019 | Sugimoto | ................ | H02M 7/217 |
| 2021/0135573 A1* | 5/2021 | Chan | ................ | H02M 3/158 |
| 2021/0175797 A1* | 6/2021 | Chan | ................ | H02M 3/155 |
| 2021/0175802 A1* | 6/2021 | Chan | ................ | H02M 1/0058 |

\* cited by examiner

BOOST CONVERTER

CROSS REFERENCE TO RELATED APPLICATIONS

This application claims priority of Taiwan Patent Application No. 109104157 filed on Feb. 11, 2020, the entirety of which is incorporated by reference herein.

BACKGROUND OF THE INVENTION

Field of the Invention

The disclosure generally relates to a boost converter, and more specifically, to a boost converter with high conversion efficiency.

Description of the Related Art

The output voltage of a conventional boost converter is often maintained at a relatively high voltage level, regardless of its input voltage. However, the output voltage with a relatively high voltage level tends to result in more power loss, and it also lowers the conversion efficiency of the boost converter. Accordingly, there is a need to propose a novel solution for solving the problems of the prior art.

BRIEF SUMMARY OF THE INVENTION

In a preferred embodiment, the invention is directed to a boost converter that includes a voltage divider circuit, a first comparator, a tunable inductive element, a power switch element, a second comparator, an output stage circuit, and a controller. The voltage divider circuit generates a divided voltage according to an input voltage. The first comparator compares the divided voltage with a first reference voltage, so as to generate a first control voltage. The tunable inductive element is coupled to the voltage divider circuit. The total inductance of the tunable inductive element can be changed by adjusting the first control voltage. The power switch element selectively couples the tunable inductive element to a ground voltage according to a clock voltage. The second comparator compares the first control voltage with a second reference voltage, so as to generate a second control voltage. The output stage circuit is coupled to the tunable inductive element and the power switch element. The output stage circuit generates an output voltage according to a third reference voltage and the second control voltage. The output stage circuit includes a tunable resistive element. The total resistance of the tunable resistive element can be changed by adjusting the second control voltage. The controller generates the clock voltage, the first reference voltage, the second reference voltage, and the third reference voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail as follows:

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
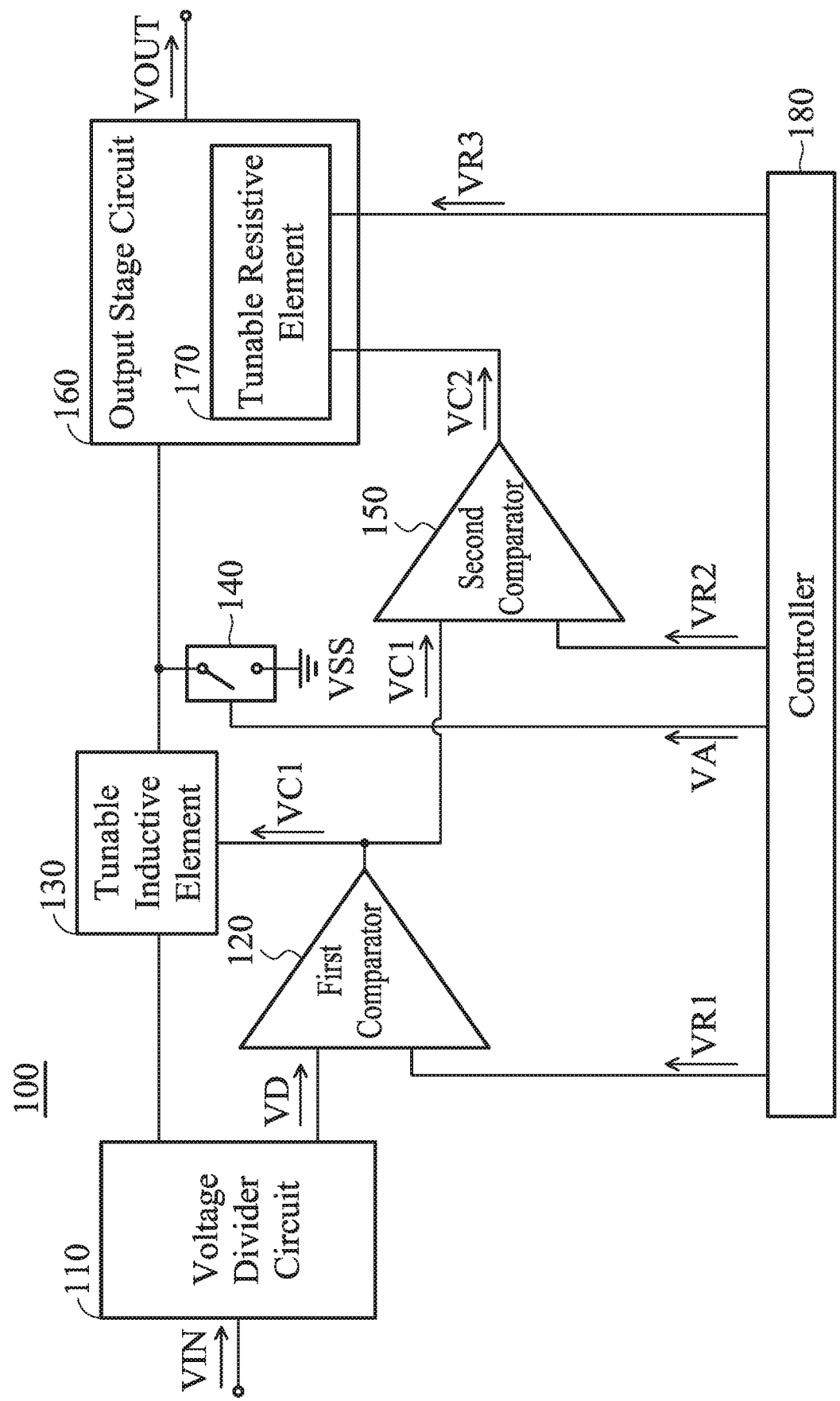
FIG. 1 is a diagram of a boost converter according to an embodiment of the invention.

FIG. 1 is a diagram of a boost converter 100 according to an embodiment of the invention. For example, the boost converter 100 may be applied to a desktop computer, a notebook computer, or an all-in-one computer. As shown in FIG. 1, the boost converter 100 includes a voltage divider circuit 110, a first comparator 120, a tunable inductive element 130, a power switch element 140, a second comparator 150, an output stage circuit 160, and a controller 180. The output stage circuit 160 includes a tunable resistive element 170. It should be noted that the boost converter 100 may further include other components, such as a voltage regulator and/or a negative feedback circuit, although they are not displayed in FIG. 1.

The voltage divider circuit 110 generates a divided voltage VD according to an input voltage VIN. The divided voltage VD may be merely a specific percentage of the input voltage VIN (e.g., from 1% to 20%). The input voltage VIN may be from an external power source. The input voltage VIN may be an AC (Alternating Current) voltage with any frequency and any magnitude. For example, the frequency of the AC voltage may be about 50 Hz or 60 Hz, and the RMS (Root-Mean-Square) value of the AC voltage may be about 110V or 220V. The first comparator 120 compares the divided voltage VD with a first reference voltage VR1, so as to generate a first control voltage VC1. The tunable inductive element 130 is considered as a boost inductor of the boost converter 100. The tunable inductive element 130 is coupled to the voltage divider circuit 110. The total inductance of the tunable inductive element 130 can be changed by adjusting the first control voltage VC1. The power switch element 140 selectively couples the tunable inductive element 130 to a ground voltage VSS (e.g., 0V) according to a clock voltage VA. For example, if the clock voltage VA has a high logic level (e.g., a logic "1"), the power switch element 140 will couple the tunable inductive element 130 to the ground voltage VSS (e.g., the power switch element 140 is similar to a short-circuited path); conversely, if the clock voltage VA has a low logic level (e.g., a logic "0"), the power switch element 140 will not couple the tunable inductive element 130 to the ground voltage VSS (e.g., the power switch element 140 is similar to an open-circuited path). The second comparator 150 compares the first control voltage VC1 with a second reference voltage VR2, so as to generate a second control voltage VC2. The output stage circuit 160 is coupled to the tunable inductive element 130 and the power switch element 140. The output stage circuit 160 generates an output voltage VOUT according to a third reference voltage VR3 and the second control voltage VC2. The output voltage VOUT may be a DC (Direct Current) voltage. The voltage level of the output voltage VOUT may be higher than the maximum value of the input voltage VIN. The total resistance of the tunable resistive element 170 of the output stage circuit 160 can be changed by adjusting the second control voltage VC2. The controller 180 may be an IC (Integrated Circuit) chip for generating a clock voltage VA, the first reference voltage VR1, the second reference voltage VR2, and the third reference voltage VR3. For example, when the boost converter 100 is initialized, the clock voltage VA may be maintained at a constant voltage. After the boost converter 100 is normally operated, the clock voltage VA can provide a periodic clock waveform. In addition, each of the first reference voltage VR1, the second reference voltage VR2, and the third reference voltage VR3 can be maintained at a respective constant voltage level. In some embodiments, if the input voltage VIN is higher than or equal to a threshold voltage, the boost converter 100 will operate in a first mode, and the output voltage VOUT will have a relatively high voltage level. Conversely, if the input voltage VIN is lower than the threshold voltage, the boost converter 100 will operate in a second mode, and the output voltage VOUT will have a relatively low voltage level. According to practical measurements, such a dual-output-mode design can prevent a relatively low input voltage VIN from causing relatively high power loss, and it can effectively improve the conversion efficiency of the boost converter 100.

The following embodiments will introduce the detailed structure and operation of the boost converter 100. It should be understood these figures and descriptions are merely exemplary, rather than limitations of the invention.

Figure 2:
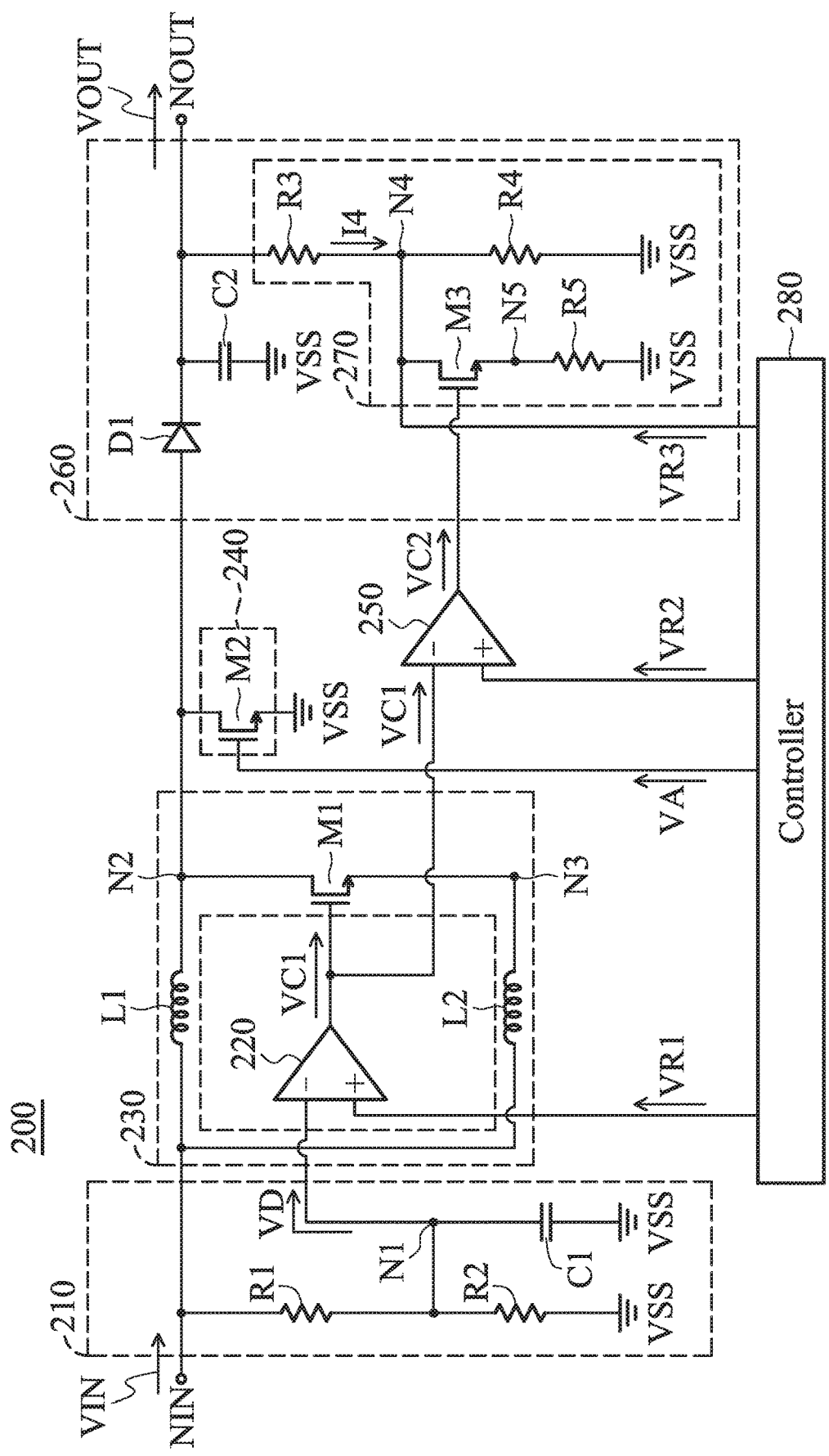
FIG. 2 is a diagram of a boost converter according to an embodiment of the invention.

FIG. 2 is a diagram of a boost converter 200 according to an embodiment of the invention. In the embodiment of FIG. 2, the boost converter 200 with an input node NIN and an output node NOUT includes a voltage divider circuit 210, a first comparator 220, a tunable inductive element 230, a power switch element 240, a second comparator 250, an output stage circuit 260, and a controller 280. The output stage circuit 260 includes a tunable resistive element 270. The input node NIN of the boost converter 200 is arranged for receiving an input voltage VIN from an external power source. The output node NOUT of the boost converter 200 is arranged for outputting an output voltage VOUT. The voltage level of the output voltage VOUT may be higher than the maximum value of the input voltage VIN.

The voltage divider circuit 210 includes a first resistor R1, a second resistor R2, and a first capacitor C1. The first resistor R1 has a first terminal coupled to the input node NIN, and a second terminal coupled to a first node N1 for outputting a divided voltage VD. The second resistor R2 has a first terminal coupled to the first node N1, and a second terminal coupled to a ground voltage VSS. The first capacitor C1 has a first terminal coupled to the first node N1, and a second terminal coupled to the ground voltage VSS. The voltage level of the divided voltage VD is determined according to the resistance ratio of the first resistor R1 to the second resistor R2. Furthermore, according to practical measurements, the first capacitor C1 can enhance the stability of the divided voltage VD at the first node N1.

The first comparator 220 may be implemented with an operational amplifier. Specifically, the first comparator 220 has a positive input terminal for receiving a first reference voltage VR1, a negative input terminal for receiving the divided voltage VD, and an output terminal for outputting a first control voltage VC1. For example, if the first reference voltage VR1 is higher than or equal to the divided voltage VD, the first control voltage VC1 will have a high logic level. Conversely, if the first reference voltage VR1 is lower than the divided voltage VD, the first control voltage VC1 will have a low logic level.

The tunable inductive element 230 includes a first inductor L1, a second inductor L2, and a first transistor M1. The first transistor M1 may be an NMOS transistor (N-type Metal Oxide Semiconductor Field Effect Transistor). The first inductor L1 has a first terminal coupled to the input node NIN, and a second terminal coupled to a second node N2. The second inductor L2 has a first terminal coupled to the input node NIN, and a second terminal coupled to a third node N3. The first transistor M1 has a control terminal for receiving the first control voltage VC1, a first terminal coupled to the third node N3, and a second terminal coupled to the second node N2. In some embodiments, if the first transistor M1 is enabled, the second inductor L2 will be coupled in parallel with the first inductor L1. Conversely, if the first transistor M1 is disabled, the second inductor L2 will not be coupled in parallel with the first inductor L1. Thus, the total inductance of the tunable inductive element 230 can be adjusted by the first comparator 220 using the first control voltage VC1.

The power switch element 240 includes a second transistor M2. The second transistor M2 may be an NMOS transistor. The second transistor M2 has a control terminal for receiving a clock voltage VA, a first terminal coupled to the ground voltage VSS, and a second terminal coupled to the second node N2. That is, the second transistor M2 can selectively couple the second node N2 to the ground voltage VSS.

The second comparator 250 may be implemented with an operational amplifier. Specifically, the second comparator 250 has a positive input terminal for receiving a second reference voltage VR2, a negative input terminal for receiving the first control voltage VC1, and an output terminal for outputting a second control voltage VC2. For example, if the second reference voltage VR2 is higher than or equal to the first control voltage VC1, the second control voltage VC2 will have a high logic level. Conversely, if the second reference voltage VR2 is lower the first control voltage VC1, the second control voltage VC2 will have a low logic level.

In addition to the tunable resistive element 270, the output stage circuit 260 further includes a diode D1 and a second capacitor C2. The diode D1 has an anode coupled to the second node N2, and a cathode coupled to the output node NOUT. The second capacitor C2 has a first terminal coupled to the output node NOUT, and a second terminal coupled to the ground voltage VSS.

The tunable resistive element 270 of the output stage circuit 260 includes a third resistor R3, a fourth resistor R4, a fifth resistor R5, and a third transistor M3. The third transistor M3 may be an NMOS transistor. The third resistor R3 has a first terminal coupled to the output node NOUT, and a second terminal coupled to a fourth node N4 for receiving a third reference voltage VR3. The fourth resistor R4 has a first terminal coupled to the fourth node N4, and a second terminal coupled to the ground voltage VSS. The third transistor M3 has a control terminal for receiving the second control voltage VC2, a first terminal coupled to a fifth node N5, and a second terminal coupled to the fourth node N4. The fifth resistor R5 has a first terminal coupled to the fifth node N5, and a second terminal coupled to the ground voltage VSS. In some embodiments, if the third transistor M3 is enabled, the fifth resistor R5 will be coupled in parallel with the fourth resistor R4. Conversely, if the third transistor M3 is disabled, the fifth resistor R5 will not be coupled in parallel with the fourth resistor R4. Thus, the total resistance of the tunable resistive element 270 can be adjusted by the second comparator 250 using the second control voltage VC2.

the fifth resistor R5 is not coupled in parallel with the fourth resistor R4, the current I4 flowing through the fourth node N4 is relatively small. In the second mode, the tunable inductive element 230 stores less energy, and the output voltage VOUT of the boost converter 200 has a relatively low voltage level.

In conclusion, the two different operation modes of the boost converter 200 will be described as following Table I:

TABLE I

| | Different Operation Modes of Boost Converter 200 | | | | |
|---|---|---|---|---|---|
| | Input voltage VIN | Tunable Inductive Element 230 | First transistor M1 | Third transistor M3 | Output voltage VOUT |
| First mode | Higher than or equal to threshold voltage | Large total inductance | Disabled | Enabled | High voltage level |
| Second mode | Lower than threshold voltage | Small total inductance | Enabled | Disabled | Low voltage level |

The controller 280 may be an IC chip for generating the clock voltage VA, the first reference voltage VR1, the second reference voltage VR2, and the third reference voltage VR3. For example, when the boost converter 200 is initialized, the clock voltage VA may be maintained at a constant voltage (e.g., the ground voltage VSS). After the boost converter 200 is normally operated, the clock voltage VA can provide a periodic clock waveform. In addition, each of the first reference voltage VR1, the second reference voltage VR2, and the third reference voltage VR3 can be maintained at a respective constant voltage level.

In some embodiments, the boost converter 200 operates in either a first mode or a second mode, and its detailed operation principles will be described as follows.

If the input voltage VIN is higher than or equal to a threshold voltage, the boost converter 200 will operate in the first mode. Since the divided voltage VD is higher than the first reference voltage VR1, the first control voltage VC1 has a low logic level for disabling the first transistor M1. Thus, the total inductance of the tunable inductive element 230 is substantially equal to the inductance of the first inductor L1 (i.e., the total inductance of the tunable inductive element 230 is relatively large). Furthermore, the second control voltage VC2 has a high logic level for enabling the third transistor M3. Because the fifth resistor R5 is coupled in parallel with the fourth resistor R4, a current I4 flowing through the fourth node N4 is relatively large. In the first mode, the tunable inductive element 230 stores more energy, and the output voltage VOUT of the boost converter 200 has a relatively high voltage level.

If the input voltage VIN is lower than the threshold voltage, the boost converter 200 will operate in the second mode. Since the divided voltage VD is lower than the first reference voltage VR1, the first control voltage VC1 has a high logic level for enabling the first transistor M1. Thus, the total inductance of the tunable inductive element 230 is substantially equal to the parallel-coupled inductance of the first inductor L1 and the second inductor L2 (i.e., the total inductance of the tunable inductive element 230 is relatively small). Furthermore, the second control voltage VC2 has a low logic level for disabling the third transistor M3. Because According to practical measurements, such a design can reduce the input power of the boost converter 200 operating in the second mode, thereby increasing the conversion efficiency of the boost converter 200 (because the conversion efficiency is the ratio of the output power to the input power, where the output power of the boost converter 200 is substantially unchanged). For example, the conversion efficiency of the boost converter 200 using the proposed design can be improved from original about 90% to about 94% in the second mode, but it is not limited thereto.

In some embodiments, the element parameters of the boost converter 200 are described as follows. The threshold voltage of the input voltage VIN may be about 170V. In the first mode, the input voltage VIN may be from 170V to 240V, and the relatively high voltage level of the output voltage VOUT may be about 400V. In the second mode, the input voltage VIN may be from 100V to 170V, and the relatively low voltage level of the output voltage VOUT may be about 250V. The resistance of the first resistor R1 may be about 16 kΩ The resistance of the second resistor R2 may be about 1 kΩ. The resistance of the third resistor R3 may be about 49 kΩ. The resistance of the fourth resistor R4 may be about 1 kΩ. The resistance of the fifth resistor R5 may be about 1.63 kΩ. The capacitance of the first capacitor C1 may be from 44.65 pF to 49.35 μF, such as 47 μF. The capacitance of the second capacitor C2 may be from 1350 μF to 1650 μF, such as 1500 μF. The inductance of the first inductor L1 may be from 180 μH to 220 μH, such as 200 μH. The inductance of the second inductor L2 may be from 180 μH to 220 μH, such as 200 μH. The switching frequency of the clock voltage VA may be about 65 kHz. The first reference voltage VR1 may be constantly about 10V. The second reference voltage VR2 may be constantly about 14V. The third reference voltage VR3 may be constantly about 5V. The above ranges of parameters are calculated and obtained according to the results of many experiments, and they help to optimize the conversion efficiency of the boost converter 200.

The invention proposes a novel boost converter, which operates in a first mode and a second mode, for providing an output voltage with different voltage levels. According to practical measurements, the boost converter using the aforementioned design can reduce its whole power loss. In conclusion, the invention can effectively increase the conversion efficiency of the boost converter, and it is suitable for application in a variety of electronic devices.

Note that the above voltages, currents, resistances, inductances, capacitances and other element parameters are not limitations of the invention. A designer can adjust these parameters according to different requirements. The boost converter of the invention is not limited to the configurations of FIGS. 1-2. The invention may merely include any one or more features of any one or more embodiments of FIGS. 1-2. In other words, not all of the features displayed in the figures should be implemented in the boost converter of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A boost converter, comprising:
    a voltage divider circuit, generating a divided voltage according to an input voltage;
    a first comparator, comparing the divided voltage with a first reference voltage, so as to generate a first control voltage;
    a tunable inductive element, coupled to the voltage divider circuit, wherein a total inductance of the tunable inductive element is adjustable according to the first control voltage;
    a power switch element, selectively coupling the tunable inductive element to a ground voltage according to a clock voltage;
    a second comparator, comparing the first control voltage with a second reference voltage, so as to generate a second control voltage;
    an output stage circuit, coupled to the tunable inductive element and the power switch element, and generating an output voltage according to a third reference voltage and the second control voltage, wherein the output stage circuit comprises a tunable resistive element, and a total resistance of the tunable resistive element is adjustable according to the second control voltage; and
    a controller, generating the clock voltage, the first reference voltage, the second reference voltage, and the third reference voltage.

2. The boost converter as claimed in claim 1, wherein if the input voltage is higher than or equal to a threshold voltage, the boost converter operates in a first mode and the output voltage has a relatively high voltage level, and if the input voltage is lower than the threshold voltage, the boost converter operates in a second mode and the output voltage has a relatively low voltage level.

3. The boost converter as claimed in claim 1, wherein the voltage divider circuit comprises:
    a first resistor, wherein the first resistor has a first terminal coupled to an input node for receiving the input voltage, and a second terminal coupled to a first node for outputting the divided voltage;
    a second resistor, wherein the second resistor has a first terminal coupled to the first node, and a second terminal coupled to the ground voltage; and
    a first capacitor, wherein the first capacitor has a first terminal coupled to the first node, and a second terminal coupled to the ground voltage.

4. The boost converter as claimed in claim 3, wherein the tunable inductive element comprises:
    a first inductor, wherein the first inductor has a first terminal coupled to the input node, and a second terminal coupled to a second node.

5. The boost converter as claimed in claim 4, wherein the tunable inductive element further comprises:
    a second inductor, wherein the second inductor has a first terminal coupled to the input node, and a second terminal coupled to a third node.

6. The boost converter as claimed in claim 5, wherein the tunable inductive element further comprises:
    a first transistor, wherein the first transistor has a control terminal for receiving the first control voltage, a first terminal coupled to the third node, and a second terminal coupled to the second node.

7. The boost converter as claimed in claim 6, wherein the power switch element comprises:
    a second transistor, wherein the second transistor has a control terminal for receiving the clock voltage, a first terminal coupled to the ground voltage, and a second terminal coupled to the second node.

8. The boost converter as claimed in claim 6, wherein the output stage circuit further comprises:
    a diode, wherein the diode has an anode coupled to the second node, and a cathode coupled to an output node for outputting the output voltage.

9. The boost converter as claimed in claim 8, wherein the output stage circuit further comprises:
    a second capacitor, wherein the second capacitor has a first terminal coupled to the output node, and a second terminal coupled to the ground voltage.

10. The boost converter as claimed in claim 9, wherein the tunable resistive element comprises:
    a third resistor, wherein the third resistor has a first terminal coupled to the output node, and a second terminal coupled to a fourth node for receiving the third reference voltage.

11. The boost converter as claimed in claim 10, wherein the tunable resistive element further comprises:
    a fourth resistor, wherein the fourth resistor has a first terminal coupled to the fourth node, and a second terminal coupled to the ground voltage.

12. The boost converter as claimed in claim 11, wherein the tunable resistive element further comprises:
    a third transistor, wherein the third transistor has a control terminal for receiving the second control voltage, a first terminal coupled to a fifth node, and a second terminal coupled to the fourth node.

13. The boost converter as claimed in claim 12, wherein the tunable resistive element further comprises:
    a fifth resistor, wherein the fifth resistor has a first terminal coupled to the fifth node, and a second terminal coupled to the ground voltage.

14. The boost converter as claimed in claim 1, wherein the first comparator has a positive input terminal for receiving the first reference voltage, a negative input terminal for receiving the divided voltage, and an output terminal for outputting the first control voltage.

15. The boost converter as claimed in claim 1, wherein the second comparator has a positive input terminal for receiving the second reference voltage, a negative input terminal for receiving the first control voltage, and an output terminal for outputting the second control voltage.

* * * * *